A. B. GRAHAM.
Harvester.
No. 67,041.
2 Sheets—Sheet 1.
Patented July 23, 1867.
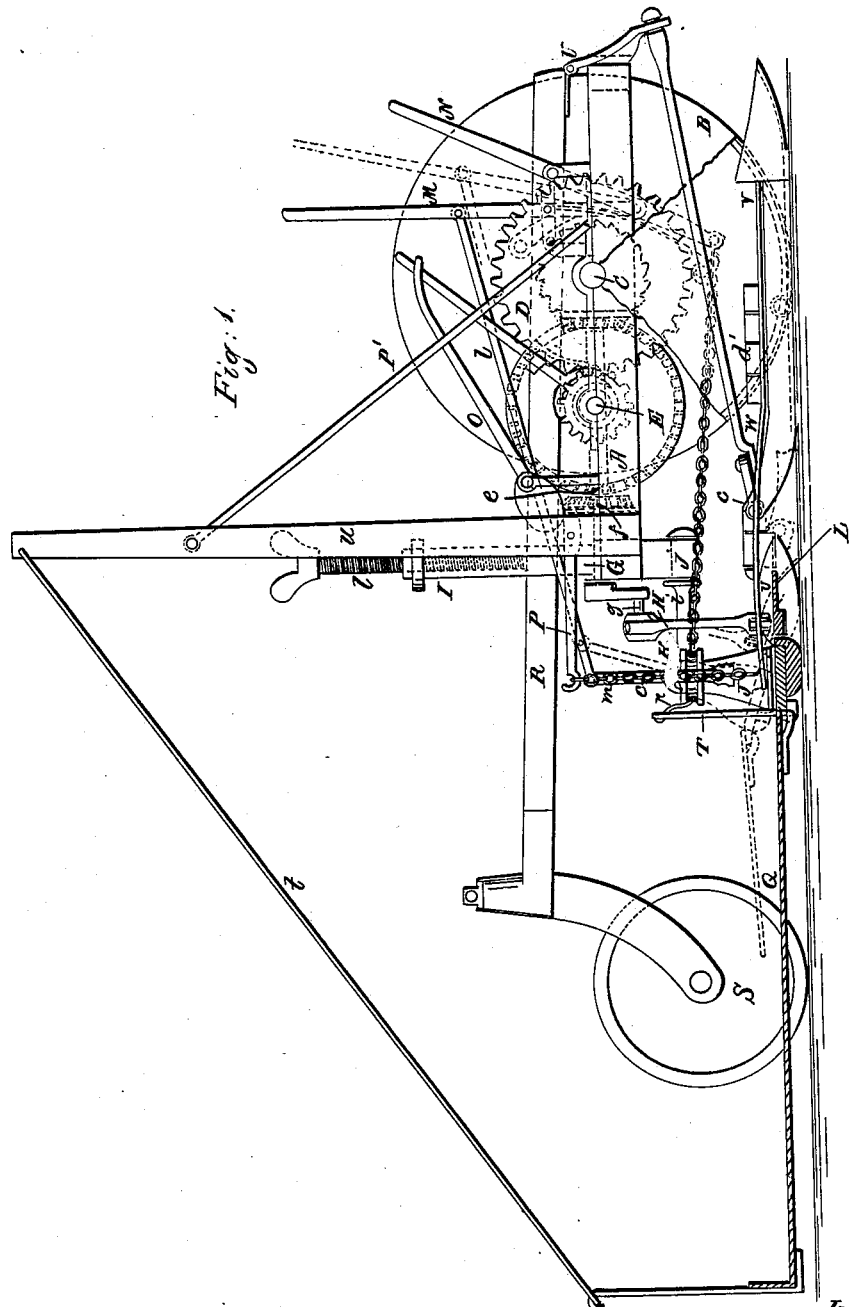

A. B. GRAHAM.
Harvester.
No. 67,041.
2 Sheets—Sheet 2.
Patented July 23, 1867.
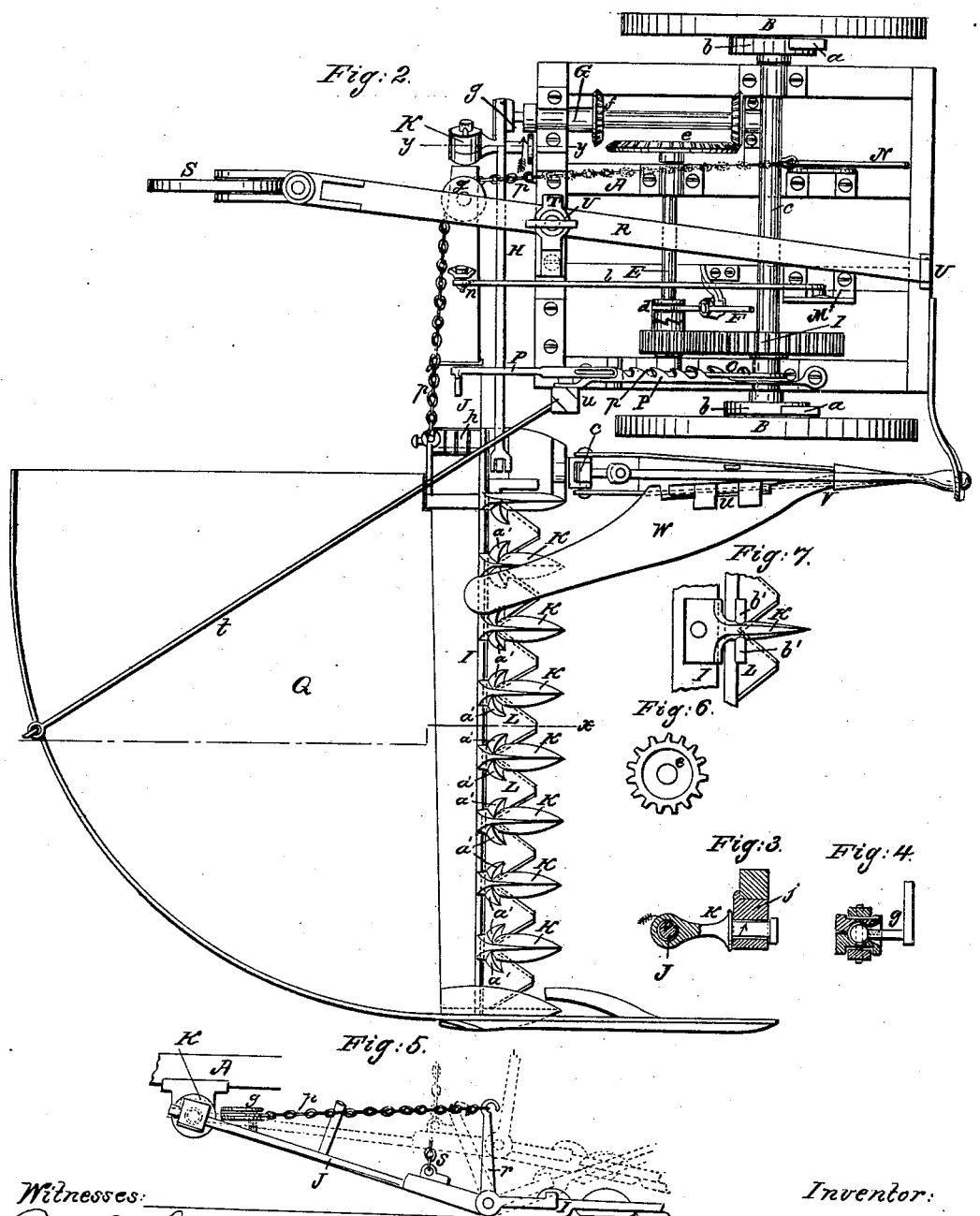

UNITED STATES PATENT OFFICE.

ALVARO B. GRAHAM, OF WAUKEGAN, ILLINOIS, ASSIGNOR TO HIMSELF, WILLIAM B. WERDEN, AND CYRUS A. WERDEN.

IMPROVEMENT IN HARVESTERS.

Specification forming part of Letters Patent No. 67,041, dated July 23, 1867.

*To all whom it may concern:*

Be it known that I, ALVARO B. GRAHAM, of Waukegan, in the county of Lake, and State of Illinois, have invented a new and Improved Grain and Grass Harvester; and I do hereby declare that the following is a full, clear, and exact description of the same, reference being had to the accompanying drawings, making a part of this specification, in which—

Figure 1 is a side sectional view of my invention, taken in the line $x\ x$, Fig. 2; Fig. 2, a plan or top view of the same; Figs. 3, 4, 5, 6, and 7, detached views of parts pertaining to the same.

Similar letters of reference indicate corresponding parts in the several figures.

This invention has for its object the prevention of the drawback and consequent side draft caused in ordinary machines by the grain-wheel, which is placed at the outer end of the finger-bar to support it and the platform.

The invention has, further, for its object the free passage of the finger-bar over the ground, and the perfect moving of the former to adjust itself to the inequalities of surface over which it may pass.

The invention has, further, for its object the cutting in a proper manner of lodged grass or grain, as well as the prevention of the choking or clogging of the sickle.

To enable those skilled in the art to fully understand and construct my invention, I will proceed to describe it.

A represents the main frame of the machine, which is supported on two wheels, B B, the latter being placed loosely on their axle C, and connected to it, when the machine is drawn forward, by the pawls and ratchets $a\ b$, so as to insure the rotation of the axle during the forward movement of the machine, but allowing the latter to be backed without rotating the axle.

On the axle C there is secured a toothed wheel, D, which gears into a pinion, $c$, placed loosely on a shaft, E, and connected with the latter, when desired, by means of a clutch, $d$, to which a lever, F, is attached. (See Fig. 2.) This shaft E has a bevel-toothed wheel, $e$, on one end of it, which gears into a bevel-pinion, $f$, on a shaft, G, the latter having a crank, $g$, on its back end, from which the sickle is driven by a pitman, H, the latter being at the rear of the main frame A.

I represents the finger-bar, the inner end of which is attached, by a joint, $h$, to a bar, J, which is at the rear of the main frame A, and is connected thereto, at its left-hand side, by a swivel or universal joint, K, as shown in Figs. 2 and 3, said joint being composed of a rod, $i$, which is allowed to turn in a bearing, $j$, attached to the main frame, and the end of the bar J being cylindrical and allowed to turn in the rod $i$, as indicated by the arrows.

Fig. 3, it will be seen, is a section of the joint, taken in the line $y\ y$, Fig. 2, and this joint admits of the bar J and finger-bar I being raised vertically, and also admits of said bars being turned in a more or less inclined position in their transverse section, to admit of the fingers $k$ and sickle L being turned more or less down toward the ground, as may be required.

This adjustment of the fingers $k$ and sickle L is effected through the medium of a lever, M, which is connected, by a rod, $l$, with an upright, $m$, on bar J. (Shown in Figs. 1 and 2.)

This lever M may be retained in any desired position within the scope of its movement by means of a perforated bar, $n$, into the holes of which a pin, $o$, on the lever catches. Other fastenings, however, may be employed for this purpose.

The finger-bar I may be raised separately from the joint $h$ as a center through the medium of a lever, N, which, like the lever M, is attached to the main frame A, and has a chain or cord, $p$, attached to its lower end, said chain or cord passing around a pulley, $q$, on the bar J, and being attached to the upper end of an upright, $r$, attached to the finger-bar at the joint $h$. Both bars, I J, may be elevated simultaneously by a lever, O, which is also attached to the main frame A, and bears at its lower end on a lever, P, the outer end of which is connected, by a chain, $s$, with the bar J. The lever O may be retained at any desired point within the scope of its movement by means of a rack-bar, P'.

The grain-platform Q is attached to the back part of the finger-bar I, and is supported at its rear by a wire or rod, t, attached to an upright, u, on the main frame A.

R is a bar, the front end of which is attached, by a hinge or joint, v, to the front end of the main frame A. This bar R extends some distance back of the main frame A, and has a caster-wheel, S, at its back end, and said bar passes through a yoke, T, on the rear part of the main frame, a screw, U, passing vertically through the top of the yoke, and bearing on the bar R. By turning the screw U it will be seen that the back part of the main frame A may be adjusted higher or lower, as desired.

From the above description it will be seen that, in case an obstruction presents itself to the inner end of the finger-bar I, the lever O is actuated, in order to raise said end of the finger-bar, and if an obstruction presents itself to the outer end of said bar the lever N is actuated.

The fingers $k$ have angular or oblique arms $a'$ $a'$ at the back parts of their upper ends, as shown in Fig. 2, and they have arms $b'$ $b'$ at the back parts of their lower surfaces, which arms project laterally at right angles from the fingers, as shown in Fig. 7. These arms serve to prevent the grass or straw being drawn in behind the sickle L, or between it and the fingers, and therefore effectually prevent the choking or clogging of the same.

This machine will work equally as well upon inclined as upon horizontal ground.

To the inner end of the finger-bar I there is attached, by a joint, $c'$, a clearer, V, which is provided with a wing, W, the latter being attached to the former by a joint, $d'$. This clearer, with its wing attached, gathers the grass or grain at the front part of the right-hand side of the main frame, and brings it within the scope of the sickle.

This sickle may be of the ordinary reciprocating kind, and therefore does not require a minute description.

I do not claim the connecting of the finger-bar I to a bar, J, by a joint, $h$, for that has been previously done; but,

Having thus described my invention, what I do claim as new, and desire to secure by Letters Patent, is—

1. The clearer V, when attached to the inner end of the finger-bar I, and provided with the wing W, substantially as and for the purpose set forth.

2. The oblique arms $a'$ $a'$ at the upper parts of the fingers $k$, in connection with the arms $b'$ $b'$ at their under sides, substantially as and for the purpose specified.

ALVARO B. GRAHAM.

Witnesses:
JOHN C. CLARKSON,
D. N. BARKER.